United States Patent
Rizkallah

(10) Patent No.: US 9,363,350 B2
(45) Date of Patent: Jun. 7, 2016

(54) METHODS AND DEVICES FOR DETECTING A HAND

(75) Inventor: Gerard Rizkallah, Chicago, IL (US)

(73) Assignee: BlackBerry Limited, Waterloo, Ontario (CA)

(*) Notice: Subject to any disclaimer, the term of this patent is extended or adjusted under 35 U.S.C. 154(b) by 588 days.

(21) Appl. No.: 13/542,242

(22) Filed: Jul. 5, 2012

(65) Prior Publication Data
US 2014/0009172 A1   Jan. 9, 2014

(51) Int. Cl.
*G01R 27/28*   (2006.01)
*H04M 1/725*   (2006.01)

(52) U.S. Cl.
CPC ...... *H04M 1/72522* (2013.01); *H04M 2250/04* (2013.01); *H04M 2250/12* (2013.01)

(58) Field of Classification Search
CPC .. G01R 27/2611; G01R 27/02; G01R 27/023; G01R 27/22; G01R 23/02; G01V 3/101; G01N 27/025; G01N 27/06
USPC ......... 324/654, 445, 76.75, 207.15, 239, 144; 455/411, 517, 574, 556.1, 41.1; 345/173–174
See application file for complete search history.

(56) References Cited

U.S. PATENT DOCUMENTS

| | | | |
|---|---|---|---|
| 8,111,144 B2 | 2/2012 | Kirkup et al. | |
| 8,594,566 B2 * | 11/2013 | Zhu et al. | H04M 1/7253 455/41.1 |
| 8,810,367 B2 * | 8/2014 | Mullins | G06F 21/32 340/5.53 |
| 9,191,055 B2 * | 11/2015 | Lehmann | H04B 1/3838 |
| 2003/0062907 A1 * | 4/2003 | Nevermann | G01D 5/48 324/637 |
| 2005/0032474 A1 * | 2/2005 | Gordon | 455/41.1 |
| 2007/0008140 A1 * | 1/2007 | Saarisalo et al. | G06K 7/0008 340/572.7 |
| 2007/0093219 A1 * | 4/2007 | Nakasato et al. | 455/124 |
| 2007/0241977 A1 * | 10/2007 | Vance | 343/745 |
| 2007/0247299 A1 * | 10/2007 | Richards | E05F 15/00 340/500 |
| 2008/0191892 A1 | 8/2008 | Kirkup et al. | |
| 2010/0244576 A1 | 9/2010 | Hillan et al. | |
| 2011/0059694 A1 * | 3/2011 | Audic | 455/41.1 |
| 2011/0298482 A1 * | 12/2011 | Tokudome | 324/686 |

(Continued)

FOREIGN PATENT DOCUMENTS

| CN | 102089989 | | 6/2011 |
|---|---|---|---|
| CN | 102098243 | * | 6/2011 |

(Continued)

OTHER PUBLICATIONS

Roland, M.; Witschnig, H.; Merlin, E.; Saminger, C., Automatic Impedance Matching for 13.56 MHz NFC Antennas, Upper Austria University of Applies Sciences, Hagenberg, Austria NXP Semiconductors, Gratkorn, Austria, 6th Symposium on Communication Systems, Networks and Digital Signal Processing, 2008 (24 pages).

(Continued)

*Primary Examiner* — Tung X Nguyen
*Assistant Examiner* — Thang Le
(74) *Attorney, Agent, or Firm* — Fish & Richardson P.C.

(57) ABSTRACT

Methods and devices for detecting a hand in proximity to an electronic device are described. The electronic device includes a near field communications (NFC) antenna. In one aspect, the method includes: monitoring an induced voltage at the NFC antenna; and determining whether a hand is in proximity to the electronic device based on the induced voltage.

19 Claims, 5 Drawing Sheets

(56) References Cited

U.S. PATENT DOCUMENTS

| | | | |
|---|---|---|---|
| 2012/0019420 A1* | 1/2012 | Caimi et al. | 343/702 |
| 2012/0154245 A1* | 6/2012 | Nagumo et al. | 343/861 |
| 2012/0202421 A1* | 8/2012 | Moosavi et al. | 455/41.1 |
| 2012/0214411 A1* | 8/2012 | Levy | 455/41.1 |
| 2013/0122970 A1* | 5/2013 | Su | 455/572 |
| 2013/0217342 A1* | 8/2013 | Abdul-Gaffoor et al. | 455/77 |
| 2013/0295845 A1* | 11/2013 | Maenpaa | 455/41.1 |
| 2013/0297926 A1* | 11/2013 | Eaton et al. | 713/100 |

FOREIGN PATENT DOCUMENTS

| | | |
|---|---|---|
| EP | 1770974 A1 | 4/2007 |
| WO | 2008/007175 | 1/2008 |
| WO | 2008007175 A1 | 1/2008 |
| WO | 2008050085 | 5/2008 |

OTHER PUBLICATIONS

Oreganero, M; Opoku, S., Using NFC Technology for Fast—Tracking Large—Size Multi—Touch Screens, Cyber Journals: Multidisciplinary Journals in Science and Technology: Journal of Selected Areas in Telecommunications (JSAT), April Edition, 2011 (6 pages).

European Patent Office, "European Search Report", issued in connection with corresponding European Patent Application No. 12179279.0, issued on Nov. 6, 2013 (6 pages).

State Intellectual Property Office of the People's Republic of China, "Office Action," issued in connection with Application No. 201310279264.0, Jan. 4, 2015, 8 pages.

Office Action issued in Canadian Application No. 2,820,605 on Feb. 3, 2015; 4 pages. (44556-CA-PAT).

Office Action issued in Chinese Application No. 201310279264.0 on Sep. 6, 2015; 18 pages.

Communication pursuant to Article 94(3) EPC issued in EP Application No. 12179279.0 on Nov. 3, 2015; 6 pages.

Cecil et al.: "Numerical Assessment of Specific Absorption Rate in the Human Body Caused by NFC Devices", Near Field Communication (NFC), 2010 Second International Workshop on IEEE, Piscataway, NJ, USA, Apr. 20, 2010; pp. 65-70.

Office Action issued in Canadian Application No. 2,820,605 on Jan. 25, 2016; 4 pages.

* cited by examiner

METHODS AND DEVICES FOR DETECTING A HAND

TECHNICAL FIELD

The present disclosure relates to electronic device management, and more particularly, to methods and electronic devices for detecting a hand in proximity to the electronic devices.

BACKGROUND

Electronic devices, such as a smartphones, are often equipped for voice and data communications over wireless networks such as cellular networks. These communications may be transmitted and received in the form of Radio Frequency (RF) signals from one or more antennas associated with the electronic devices. In order to ensure connectivity for communications, the RF signals need to be transmitted and received at appropriate power output levels. Otherwise, the electronic devices may suffer from dropped calls, reduced data throughput, and loss in data connection.

Wireless network carriers operating cellular networks sometimes provide specifications for the power output of RF signals and minimum receive sensitivity to these RF signals by the electronic devices. More particularly, wireless network carriers sometimes provide specifications for the requisite power output and minimum sensitivity to the RF signals by the electronic devices at various operating states of the electronic devices (for example, free space operation, head operation, and head and hand operation). Original equipment manufacturers (OEMs) are required to design electronic devices to meet the requisite specifications for power output of the associated RF signals and minimum receive sensitivity to these RF signals in these various operating states.

BRIEF DESCRIPTION OF THE DRAWINGS

Reference will now be made, by way of example, to the accompanying drawings which show an embodiment of the present application, and in which.

Like reference numerals are used in the drawings to denote like elements and features.

DETAILED DESCRIPTION OF EXAMPLE EMBODIMENTS

In one aspect, the present application describes a method for detecting a hand in proximity to an electronic device. The electronic device includes a near field communications (NFC) antenna. The method includes: monitoring an induced voltage at the NFC antenna; and determining whether a hand is in proximity to the electronic device based on the induced voltage.

In another aspect, the present application describes an electronic device for detecting a hand in proximity to the electronic device. The electronic device includes a memory and a near field communications (NFC) antenna. The electronic device also includes a processor coupled with the memory and the NFC antenna. The processor is configured to: monitor an induced voltage at an NFC antenna; and determine that a hand is in proximity to the electronic device based on the induced voltage.

In yet another aspect, the present application describes a computer-readable storage medium having stored thereon computer executable instructions for detecting a hand in proximity to an electronic device. The computer executable instructions include instructions for: monitoring an induced voltage at a near field communications (NFC) antenna; and determining that a hand is in proximity to the electronic device based on the induced voltage.

Other example embodiments of the present disclosure will be apparent to those of ordinary skill in the art from a review of the following detailed description in conjunction with the drawings.

Example embodiments of the present disclosure are not limited to any particular operating system, electronic device architecture, server architecture or computer programming language.

Example Electronic Device

Figure 1:
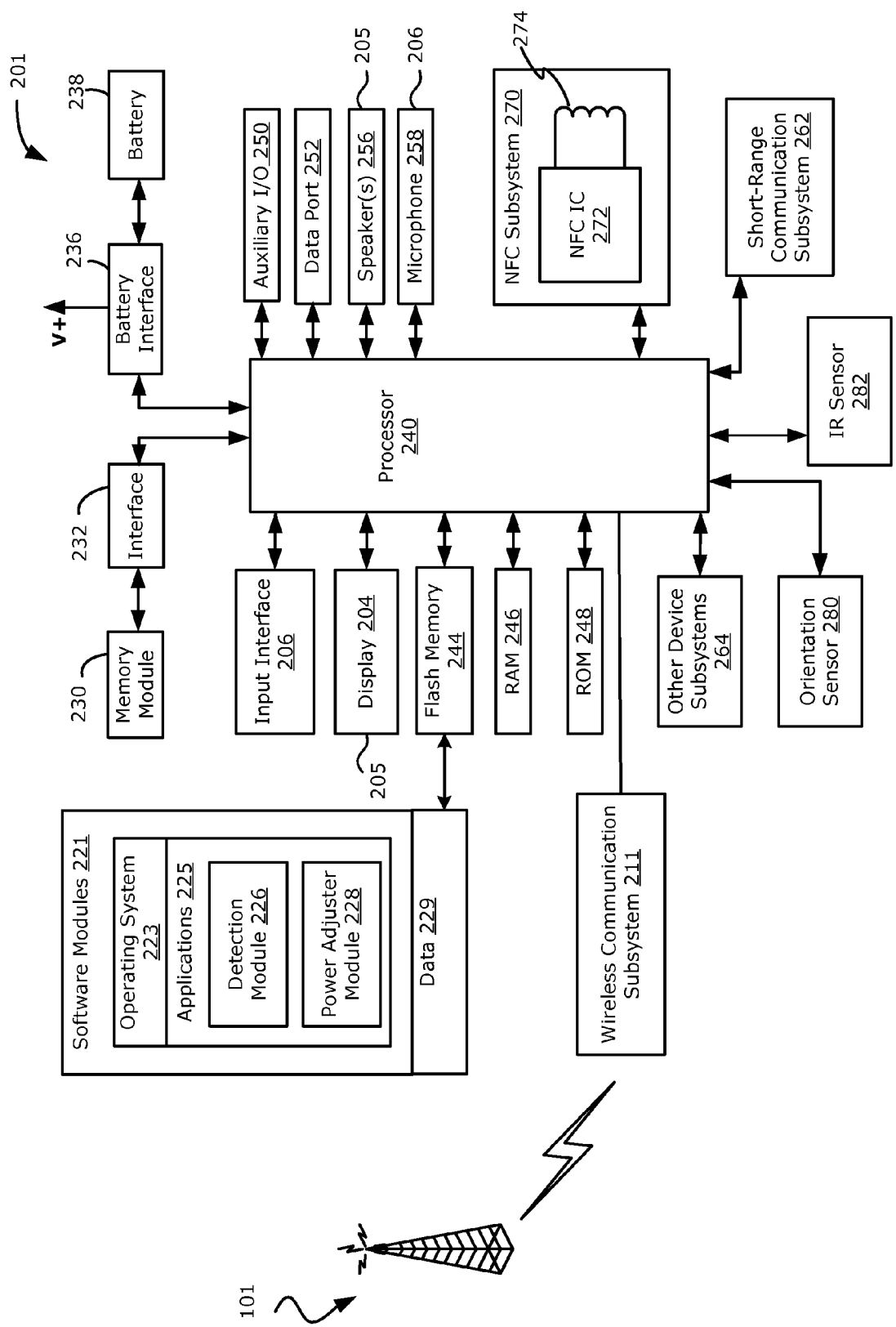
FIG. 1 is a block diagram illustrating an example electronic device in accordance with example embodiments of the present disclosure.

Reference is first made to FIG. 1 which illustrates an example electronic device 201 in which example embodiments described in the present disclosure can be applied. In the example embodiment illustrated, the electronic device 201 is a mobile communication device. That is, the electronic device 201 is configured to communicate with other electronic devices, servers and/or systems (i.e. it is a "communication" device) and the electronic device 201 is portable and may be easily moved between different physical locations (i.e. it is a "mobile" device). However, in other example embodiments, the electronic device 201 may not be portable (i.e. may not be a "mobile" device) and/or may not be configured to communicate with other systems (i.e. may not be a "communication" device).

Depending on the functionality provided by the electronic device 201, in various example embodiments the electronic device 201 may be a multiple-mode communication device configured for both data and voice communication, a mobile telephone such as a smartphone, a wearable computer such as a watch, a tablet computer such as a slate computer, a personal digital assistant (PDA), or a computer system. The electronic device 201 may take other forms apart from those specifically listed above. The electronic device 201 may also, in various example embodiments, be referred to as a mobile communications device, a communication device, a mobile device, an electronic device and, in some cases, as a device.

The electronic device 201 includes a controller including at least one processor 240 (such as a microprocessor) which controls the overall operation of the electronic device 201. The processor 240 interacts with device subsystems such as a wireless communication subsystem 211 for exchanging radio frequency signals with a wireless network 101 to perform communication functions. The processor 240 may be communicably coupled with additional device subsystems including one or more output interfaces 205 (such as a display 204 and/or a speaker 256), one or more input interfaces 206

(such as a microphone 258, a keyboard (not shown), control buttons (not shown), a touch-sensitive overlay (not shown) associated with a touchscreen display, a camera (not shown) and/or other input interfaces 206), memory (such as flash memory 244, random access memory (RAM) 246, read only memory (ROM) 248, etc.), auxiliary input/output (I/O) subsystems 250, a data port 252 (which may be a serial data port, such as a Universal Serial Bus (USB) data port), a short-range communication subsystem 262 and other device subsystems generally designated as 264. Some of the subsystems shown in FIG. 1 perform communication-related functions, whereas other subsystems may provide "resident" or on-device functions.

In at least some example embodiments, the electronic device 201 may include a touchscreen display which acts as both an input interface 206 (i.e. touch-sensitive overlay) and an output interface 205 (i.e. display 204). The touchscreen display may be constructed using a touch-sensitive input surface which is connected to an electronic controller and which overlays the display 204. The touch-sensitive overlay and the electronic controller provide a touch-sensitive input interface 206 and the processor 240 interacts with the touch-sensitive overlay via the electronic controller.

The particular design of the wireless communication subsystem 211 depends on the wireless network 101 in which the electronic device 201 is intended to operate. The wireless network 101 may include one or more of a Wireless Wide Area Network (WWAN) and/or a Wireless Local Area Network (WLAN) and/or other suitable network arrangements. In some example embodiments, the electronic device 201 is configured to communicate over both the WWAN and WLAN, and to roam between these networks. The electronic device 201 may send and receive communication signals over the wireless network 101 via the wireless communication subsystem 211 after the required network registration or activation procedures have been completed. Greater details of an example wireless communication subsystem 211 of the electronic device 201 are provided below with reference to FIG. 2.

In at least some example embodiments, the auxiliary input/output (I/O) subsystems 250 may include an external communication link or interface; for example, an Ethernet connection. The electronic device 201 may include other wireless communication interfaces for communicating with other types of wireless networks 101; for example, a wireless network 101 such as an orthogonal frequency division multiplexed (OFDM) network. The auxiliary I/O subsystems 250 may include a vibrator for providing vibratory notifications in response to various events on the electronic device 201 such as receipt of an electronic communication or incoming phone call, or for other purposes such as haptic feedback (i.e. touch feedback).

In at least some example embodiments, the electronic device 201 may provide for communications between the electronic device 201 and other devices, tags or systems over the Near Field Communications (NFC) protocol. The NFC protocol is a set of standards that allow electronic devices 201 to wirelessly communicate with other devices and tags when they are in close proximity. The NFC protocol typically operates within the frequency band of 13.56 MHz and has a working distance of 4 cm or less. There are three data rates of transfer within the NFC protocol: 106 kilobits per second (kbit/s), 212 kbit/s and 424 kbit/s. There are two modes of communications supported by the NFC protocol: passive communication mode and active communication mode. In the passive communication mode, for example, one electronic device 201 provides an electro-magnetic carrier field and the other electronic device 201 answers by modulating the electro-magnetic carrier field. In the active communication mode, for example, both electronic devices 201 communicate with each other by alternatively generating their own electro-magnetic carrier fields.

The electronic device 201 includes an NFC subsystem 270 configured to communicate using the NFC protocol. The NFC subsystem 270 includes an NFC antenna 274 coupled to an NFC integrated circuit (IC) 272. The NFC IC 272 is a dedicated controller which controls the operation of the NFC antenna 274, and is communicably coupled to the processor 240. In one example, the NFC antenna 274 may be an inductor (i.e. a wired coil) that provides an electro-magnetic carrier field for communications over the NFC protocol. The NFC IC 272 may generate an alternating current at 13.56 MHZ through the NFC antenna 274 which induces the electro-magnetic carrier field for communications within other electronic devices 201 equipped with NFC interfaces.

As the NFC antenna 274 has a specific load, voltage is also induced within the NFC antenna 274 when an electro-magnetic carrier field is generated. Accordingly, the NFC antenna 274 produces a particular induced voltage due to the load of the NFC antenna 274. A load condition within the electro-magnetic field may vary if there is the presence of an additional load. For example, during the NFC protocol communication process, the presence of another electronic device 201 within the vicinity of the electro-magnetic carrier field may increase the load condition, and in turn the induced voltage within the NFC antenna 274. Additionally, the presence of a hand (such as a user holding the electronic device 201) or a flat surface (on which the electronic device 201 may rest) that is within the vicinity of the electro-magnetic carrier field may also increase the load condition, and in turn the induced voltage within the NFC antenna 274.

The functions and features of the NFC subsystem 270 may be used for other purposes beyond wireless communications such as for detection and power adjusting purposes. For example, in at least some example embodiments, the electronic device 201, or more particularly one or more modules or software applications within the electronic device 201, may monitor the induced voltage within the NFC antenna 274, and determine that a hand is in proximity to the electronic device 201 based on a change in the induced voltage that is caused by a change in the load condition within the electro-magnetic carrier field generated by the NFC antenna 274 due to the presence of the hand. Based on the detection of the hand, the electronic device 201 may in turn adjust the power output of a mobile antenna (which may be referred to as the total radiated power (TRP)) associated with the electronic device 201 (for example, in the wireless communication subsystem 211) and/or may adjust the total isotropic sensitivity (TIS) associated with the mobile antenna.

In one example, the NFC antenna 274 may be located near a rear side of the electronic device 201. For example, the NFC antenna 274 may be located underneath the housing on a rear side of the electronic device 201. That is, the NFC antenna 274 may be situated between the rear side housing cover and most of the device components of the electronic device 201. Accordingly, changes in load conditions within the NFC antenna 274 may occur when a load such as a hand of a user is placed at or near the rear side of the electronic device 201.

The front side of the electronic device 201 is typically the side on which the display 204 is mounted. In contrast, the rear side is typically a side which does not include the main display 204 of the electronic device 201. The rear side, in at least some embodiments, is the side of the electronic device 201 which is opposite the side which includes the display 204.

The short-range communication subsystem 262 is an additional optional component which provides for communication between the electronic device 201 and different systems or devices, which need not necessarily be similar devices. For example, the short-range communication subsystem 262 may include an infrared device and associated circuits and components, or a wireless bus protocol compliant communication mechanism such as a Bluetooth® communication module to provide for communication with similarly-enabled systems and devices.

In at least some example embodiments, the electronic device 201 also includes a removable memory module 230 (which may be flash memory, such as a removable memory card) and a memory interface 232. Network access may be associated with a subscriber or user of the electronic device 201 via the memory module 230, which may be a Subscriber Identity Module (SIM) card for use in a GSM network or other type of memory card for use in the relevant wireless network type. The memory module 230 is inserted in or connected to the memory interface 232 of the electronic device 201 in order to operate in conjunction with the wireless network 101.

The data port 252 may be used for synchronization with a user's host computer system (not shown). The data port 252 enables a user to set preferences through an external device or software application and extends the capabilities of the electronic device 201 by providing for information or software downloads to the electronic device 201 other than through the wireless network 101. The alternate download path may for example, be used to load an encryption key onto the electronic device 201 through a direct, reliable and trusted connection to thereby provide secure device communication.

In at least some example embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to a host computer system using standard connectivity protocols. When a user connects their electronic device 201 to the host computer system via a USB cable or Bluetooth® connection, traffic that was destined for the wireless network 101 is automatically routed to the electronic device 201 using the USB cable or Bluetooth® connection. Similarly, any traffic destined for the wireless network 101 is automatically sent over the USB cable or Bluetooth® connection to the host computer system for processing.

In at least some example embodiments, the electronic device 201 may include one or more sensors. For example, the electronic device 201 may include an orientation sensor 280 that detects the orientation of the electronic device 201 or that generates information from which the orientation of the electronic device 201 can be determined, such as acceleration information. In some example embodiments, the orientation sensor 280 is an accelerometer, such as a three-axis accelerometer. An accelerometer is a sensor which converts acceleration from motion (e.g. movement of the electronic device 201 or a portion thereof due to the strike force) and gravity which are detected by a sensing element into an electrical signal (producing a corresponding change in output). Accelerometers may be available in one, two or three axis configurations. Higher order axis configurations are also possible. Accelerometers may produce digital or analog output signals depending on the type of accelerometer. In other example embodiments, the orientation sensor 280 may be of other forms instead of or in addition to an accelerometer. For example, the orientation sensor 280 may be a gravity sensor, a gyroscope, a tilt sensor, an electronic compass or other suitable sensors, or combinations thereof.

The orientation sensor 280 may generate orientation data which specifies the orientation of the electronic device 201. The orientation data, in at least some example embodiments, specifies the orientation of the electronic device 201 relative to the gravitational field of the earth. Accordingly, in at least some example embodiments, the orientation data may be used when determining whether a hand of a user is in proximity to the electronic device 201 in addition to a change in the induced voltage within the NFC antenna 274. For example, in at least some example embodiments, orientation data that indicates that the electronic device 201 is in a tabletop orientation (that is, the electronic device 201 is lying flat on its rear-side on a surface (such as a floor, ground, table, etc.)) may be used to determine that a hand is not in proximity to the electronic device 201 as a change in load condition within the NFC antenna may be caused by the surface and not the hand.

The electronic device 201 may also include an infrared (IR) sensor 282. The infrared sensor 282 may sense objects within the proximity of the electronic device 201 by measuring infrared light (i.e. light outside the visible spectrum) reflecting from objects within a field of view. More particularly, the infrared sensor emits infrared light and detects reflected infrared light. For example, the infrared sensor 282 may include one or more infrared emitting devices such as a diode. The diodes are configured to emit infrared light from a side of the electronic device 201 (such as at or near a front side of the electronic device 201). When light is emitted by the diodes, the light may be reflected by an object (such as a head of a user) which is located within the sensing area (i.e. the side of the electronic device 201 from which the infrared light is emitted). The reflected infrared light is then received by the infrared sensor 282. For example, the infrared sensor 282 may include one or more infrared receiving devices such as a photodiodes. The photodiodes produce electrical signals which depend on the amount of light which was output from the diodes and which was reflected by an object and received at the photodiodes. Accordingly, different objects may be sensed and classified by the infrared sensor 282.

In at least some example embodiments, the infrared sensor may be used to detect a head of a user of the electronic device 201. For example, a head of a user which is within the sensing area of the infrared sensor 282, may reflect infrared light that is emitted from the infrared sensor 282. The reflected infrared light may then be received by the infrared sensor 282. The infrared sensor 282 may then determine the object to be the head of a user based on the level of infrared light emitted and received. For example, if the amount of infrared light received exceeds a threshold, then the electronic device 201 may determine that a head may be present. That is, the electronic device 201 may then determine that a head of a user is in proximity to the electronic device 201.

It will be appreciated that the electronic device 201 may include other sensors not specifically described herein.

The electronic device 201 also includes or is connectable to a power source such as a battery 238. The battery may be one or more rechargeable batteries that may be charged for example, through charging circuitry coupled to a battery interface 236 such as the data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The electronic device 201 stores data 229 in an erasable persistent memory, which in one example embodiment is the flash memory 244. In various example embodiments, the data 229 includes service data including information used by the electronic device 201 to establish and maintain communication with the wireless network 101. The data 229 may also include user application data such as email messages, address book and contact information, image data, calendar and schedule information, notepad documents, image files, and other commonly stored user information stored on the electronic device 201 by its user, and other data. The data 229 stored in the persistent memory (e.g. flash memory 244) of the electronic device 201 may be organized, at least partially, into one or more databases or data stores. The databases or data stores may contain data items of the same data type or associated with the same application. For example, email messages, contact records, and task items may be stored in individual databases within the memory. The data 229 may further include NFC related data and sensor related data. For example, the NFC related data may include a list of pre-determined levels for voltage fluctuations that may indicate that a particular type of load (such as a hand) is present near the electronic device.

A predetermined set of applications that control basic device operations, including data and possibly voice communication applications may be installed on the electronic device 201 during or after manufacture. Additional applications and/or upgrades to the operating system 223 or software applications 225 may also be loaded onto the electronic device 201 through the wireless network 101, the auxiliary I/O subsystem 250, the data port 252, the short-range communication subsystem 262, or other suitable device subsystem 264. The downloaded programs or code modules may be permanently installed, for example, written into the program memory (i.e. the flash memory 244), or written into and executed from the RAM 246 for execution by the processor 240 at runtime.

The electronic device 201 may, in at least some example embodiments, be a mobile communication device which may provide two principal modes of communication: a data communication mode and a voice communication mode. In the data communication mode, a received data signal such as a text message, an email message, or a web page download will be processed by the wireless communication subsystem 211 and input to the processor 240 for further processing. For example, a downloaded web page may be further processed by a browser application or an email message may be processed by an email messaging application and output to the display 204. A user of the electronic device 201 may also compose data items, such as email messages, for example, using the input devices in conjunction with the display 204. These composed items may be transmitted through the wireless communication subsystem 211 over the wireless network 101.

In the voice communication mode, the electronic device 201 provides telephony functions and operates as a typical cellular phone. The overall operation is similar to the data communication mode, except that the received signals would be output to the speaker 256 and signals for transmission would be generated by a transducer such as the microphone 258. The telephony functions are provided by a combination of software/firmware (e.g., a voice communication module) and hardware (e.g., the microphone 258, the speaker 256 and input interfaces 206). Alternative voice or audio I/O subsystems, such as a voice message recording subsystem, may also be implemented on the electronic device 201. Although voice or audio signal output is typically accomplished primarily through the speaker 256, the display 204 may also be used to provide an indication of the identity of a calling party, duration of a voice call, or other voice call related information.

The processor 240 operates under stored program control and executes software modules 221 stored in memory such as persistent memory; for example, in the flash memory 244. As illustrated in FIG. 1, the software modules 221 include operating system software 223 and other software applications 225 including a detection module 226 and a power adjuster module 228.

The software applications 225 on the electronic device 201 may also include a range of additional applications including, for example, a notepad application, Internet browser application, voice communication (e.g. telephony) application, mapping application, or a media player application, or any combination thereof. Each of the software applications 225 may include layout information defining the placement of particular fields and graphic elements (e.g. text fields, input fields, icons, etc.) in the user interface (e.g. the display 204) according to the application.

The software modules 221 or parts thereof may be temporarily loaded into volatile memory such as the RAM 246. The RAM 246 is used for storing runtime data variables and other types of data or information, as will be apparent. Although specific functions are described for various types of memory, this is merely one example, and it will be appreciated that a different assignment of functions to types of memory could also be used.

As noted above, the electronic device 201 includes various detection capabilities of objects within its surroundings. In one such example, the detection module 226 may be configured to perform some of these detection features and functionalities by interfacing with various components such as the NFC subsystem 270 and/or the sensors (such as the infrared sensor 282 and/or the orientation sensor 280). For example, in at least some example embodiments, the detection module 226, may monitor an induced voltage at the NFC antenna 274, and determine whether a hand is in proximity to the electronic device 201 based on the induced voltage. For example, the detection module 226 may interface with the NFC IC 272 to examine induced voltage fluctuations within the NFC antenna 274 due to load condition changes. If the induced voltage fluctuation is above a pre-determined threshold that may correlate to the load of a hand, the detection module 226 may determine that a hand is in proximity of the electronic device 201. For example, as the NFC antenna 274 is located near a rear side of the electronic device 201, the detection module 226 may determine the presence of a hand when a user conventionally holds the electronic device 201 for operation (i.e. holding the electronic device 201 from a rear side).

In at least some example embodiments, the detection module 226 may also interface with the infrared sensor 282 and/or the orientation sensor 280 for detection purposes. For example, in at least some example embodiments, the detection module 226, in addition to determining the presence of a hand utilizing the NFC subsystem 270, may determine the presence of a head utilizing the infrared sensor 282. The detection module 226 may be configured to interface with the infrared sensor 282 to receive a reflection of infrared light emitted by the infrared sensor 282, and determine whether a head is in proximity to the electronic device 201 based on the reflection. That is, the detection module 226 determines whether a head of a user is in the vicinity of the electronic device 201 by analyzing the reflected light received by the infrared sensor 282. For example, as the infrared sensor 282 may be located on a front side of the electronic device 201

(and accordingly emits infrared light from a front side), the detection module 226 may determine the presence of a head when a user is conventionally operating the electronic device 201 for voice communication (i.e. holding the electronic device 201 close to an ear). Accordingly, the detection module 226 may concurrently detect the presence of a hand and a head of a user near the electronic device 201.

In at least some example embodiments, the detection module 226 may also utilize the orientation sensor 280 when detecting the presence of a hand and/or head. For example, in at least some example embodiments, the detection module 226, prior to determining the presence of a hand utilizing the NFC subsystem 270 (and/or determining the presence of a head utilizing the infrared sensor 282), may obtain orientation data gathered by the orientation sensor 280, and then determine whether a hand (and/or head) is in proximity to the electronic device 201 based on the induced voltage and the orientation data. Accordingly, the orientation of the electronic device 201 may be a factor in determining whether a hand of a user is near the electronic device 201 (and/or when determining whether a head is near the electronic device 201). For example, if the orientation of the electronic device 201 is a table-top orientation, the electronic device 201 may conclude that the presence of a load condition detected by a change in voltage at an NFC subsystem 270 is caused by the presence of an object that is not a hand; for example, it is caused by a table. In at least some embodiments, the electronic device 201 may determine if the electronic device 201 is in a top-up tabletop orientation in which the rear side of the electronic device is resting on a table and, if so, may determine that any change in voltage at the NFC subsystem 270 is caused by the table and not a hand (i.e. the electronic device 201 may determine that a hand is not present).

After the detection module 226 performs the detection operations, the power adjuster module 228 may be configured to adjust the power output of the mobile antenna associated with electronic device 201 and/or to adjust the total isotropic sensitivity (TIS) associated with the mobile antenna. That is, the power adjuster module 228 may change the power of the RF signals transmitted by the electronic device 201 for communications to the wireless network 101. The adjustment of the power output and/or the total isotropic sensitivity may be based on the detection results of the detection module 226. For example, in at least some example embodiments, the power adjuster module 228 may adjust the power output (and/or the total isotropic sensitivity) of the mobile antenna to a first power output state if both a hand and head are detected, to a second power output state if only a head is detected, to a third power output state if neither a hand or a head is detected, and to a fourth power output state if only a hand is detected. In at least some example embodiments, the power adjuster module 228 may adjust the power output of the mobile antenna by controlling one or more tunable capacitors. For example, when both a hand and a head are detected, the one or more capacitors may be tuned to impedance match the mobile antenna to maximize the power output.

Specific functions and features of the detection module 226 and the power adjuster module 228 will be discussed in greater detail below with reference to FIGS. 5 and 6.

In at least some example embodiments, the operating system 223 may perform some or all of the functions of the detection module 226 and/or the power adjuster module 228. In other example embodiments, the functions or a portion of the functions of the detection module 226 and/or the power adjuster module 228 may be performed by one or more other applications. For example, in at least some example embodiments, the detection and/or the power adjusting functions may be performed by other applications.

Further, while the detection module 226 and the power adjuster module 228 have been illustrated as a stand-alone application, in other example embodiments, the detection module 226 and/or the power adjuster module 228 may be implemented as part of the operating system 223 or another application 225. Furthermore, in at least some example embodiments, the functions of the detection module 226 and/or the power adjuster module 228 may be provided by a plurality of software modules. In at least some example embodiments, these software modules may be divided among multiple applications.

Example Wireless Communication Subsystem

As discussed above, the electronic device 201 includes a wireless communication subsystem 211 to allow the electronic device 201 to communicate over a wireless network 101. An example wireless communication subsystem 211 design is now illustrated with reference to FIG. 2.

The example wireless communication subsystem 211 includes a receiver 212, a transmitter 213, and associated components, such as one or more antenna elements referred to as a mobile antenna 220, a power amplifier 214, local oscillators (LOs) 216, and a processing module such as a digital signal processor (DSP) 217. The mobile antenna 220 may be embedded or internal to the electronic device 201 and the mobile antenna 220 may be shared by both the receiver 212 and the transmitter 213. The particular design of the wireless communication subsystem 211 depends on the wireless network 101 in which the electronic device 201 is intended to operate.

In at least some example embodiments, the electronic device 201 may communicate with any one of a plurality of fixed transceiver base stations of the wireless network 101 within its geographic coverage area. The electronic device 201 may send and receive RF signals for communications over the wireless network 101 via the mobile antenna 220 after the required network registration or activation procedures have been completed.

RF signals received at the mobile antenna 220 from the wireless network 101 may pass through a power amplifier 214 which may amplify the power of the received signal. Accordingly, the electronic device 201 may have improved coverage as weaker received signals may be captured and amplified. Similarly, RF signals transmitted by the mobile antenna 220 to the wireless network 101 may also pass through the power amplifier 214 which may amplify the power of the transmitted signals. Accordingly, the electronic device 201 may consume less power as low power signals may be generated for transmission, which may only need to be amplified prior to transmission.

It will be appreciated that, in at least some example embodiments, the power amplifier 214 may be embedded within each of the receiver 212 and the transmitter 213.

Received signals passing through the power amplifier 214 are input to the receiver 212, which may perform such common receiver functions as frequency down conversion, filtering, channel selection, etc., as well as analog-to-digital (A/D) conversion. A/D conversion of a received signal allows more complex communication functions such as demodulation and decoding to be performed in the DSP 217. In a similar manner, signals to be transmitted are processed, including modulation and encoding, for example, by the DSP 217. These DSP-processed signals are input to the transmitter 213 for digital-to-analog (D/A) conversion, frequency up conversion, filtering, etc. and pass through the power amplifier 214 for transmission to the wireless network 101 via the mobile antenna 220. The DSP 217 not only processes communication signals, but may also provide for receiver 212 and transmitter 213 control. For example, the gains applied to communication signals in the receiver 212 and the transmitter 213 may be adaptively controlled through automatic gain control algorithms implemented in the DSP 217.

In at least some example embodiments, the wireless communication subsystem 211 may additionally include a tunable antenna match 218. The tunable antenna match 218 includes one or more tunable capacitors (which may be in parallel to one another). The one or more tunable capacitors may be controlled (for example, by the processor 240) to vary the capacitance supplied by them. Accordingly, the one or more tunable capacitors may adjust the power output of the mobile antenna 220. For example, the power of signals for transmission may be varied. For example, in at least some example embodiments, the one or more tunable capacitors may perform impedance matching to maximize the power output of the mobile antenna 220. That is, the one or more tunable capacitors may be tuned to match the impedance of the power amplifier 214 (or in other example embodiments, the transmitter 213) to the complex conjugate impedance of the mobile antenna 220 which maximizes the power transfer to the mobile antenna 220 and therefore maximizes power output (or minimizes reflections from the mobile antenna 220).

As mentioned above, in at least some example embodiments, the electronic device 201 may adjust the power output (and/or the total isotropic sensitivity) of the mobile antenna 220 to one of a number of states based on the determination of a hand and/or a head in proximity to the electronic device 201. In such example embodiments, the one or more tunable capacitors may be varied (for example, the processor 240 may perform the tuning of the capacitors) to adjust the power output (and/or the total isotropic sensitivity) of the mobile antenna 220 to the desired power output state depending on the determination. In at least some example embodiments, a power output state may require the power output of the mobile antenna 220 to be maximized, and accordingly the one or more tunable capacitors are tuned for impedance matching. That is, the tunable capacitors are adjusted so that the impedance of the mobile antenna is matched to the impedance of the remainder of the wireless communication subsystem 211. More particularly, the mobile antenna 220 is impedance matched to the RF front end.

Figure 2:
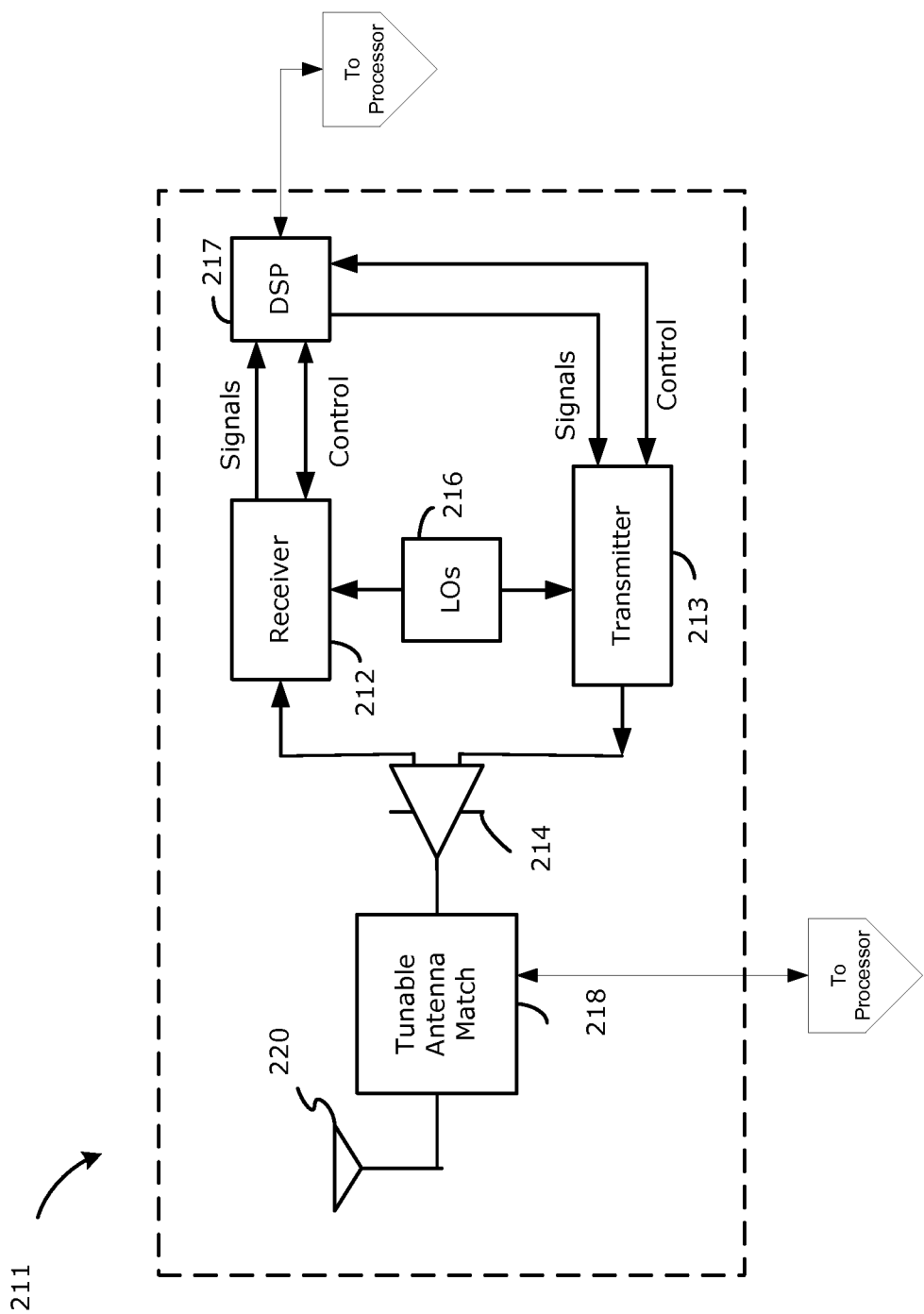
FIG. 2 is a block diagram illustrating an example wireless communication subsystem of the example electronic device of FIG. 1 in accordance with example embodiments of the present disclosure.

The wireless communication subsystem 211 illustrated in FIG. 2 is an example wireless communication subsystem. In other example embodiments, the wireless communication subsystem 211 may be of other configurations not specifically described herein.

While FIG. 2 illustrates an embodiment in which a single mobile antenna 220 is shared by both the receiver 212 and the transmitter 213, in other embodiments, separate mobile antennas may be used.

Example Smartphone Electronic Device

As discussed above, the electronic device 201 may take a variety of forms. For example, in at least some example embodiments, the electronic device 201 may be a smartphone.

Figure 3:
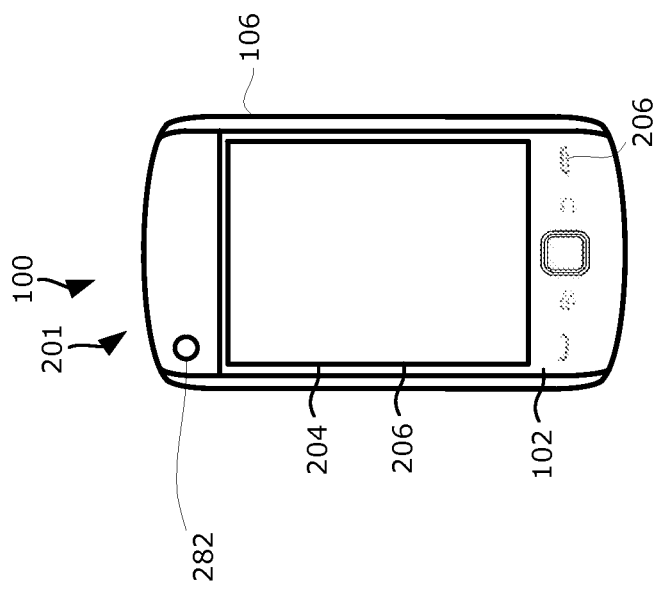
FIG. 3 is a front view of an example smartphone in accordance with example embodiments of the present disclosure.

Referring now to FIG. 3, a front view of an example electronic device 201 which is a smartphone 100 is illustrated. The smartphone 100 is a mobile phone which offers more advanced computing capability than a basic non-smartphone cellular phone. For example, the smartphone 100 may have the ability to run third party applications which are stored on the smartphone 100.

The smartphone 100 may include the components discussed above with reference to FIG. 1 or a subset of those components. The smartphone 100 includes a housing 106 which houses at least some of the components discussed above with reference to FIG. 1.

In the example embodiment illustrated, the smartphone 100 includes a display 204, which may be a touchscreen display which acts as an input interface 206. The display 204 is disposed within the smartphone 100 so that it is viewable at a front side 102 of the smartphone 100. That is, a viewable side of the display 204 is disposed on the front side 102 of the smartphone. In the example embodiment illustrated, the display 204 is framed by the housing 106.

The example smartphone 100 also includes other input interfaces 206 such as one or more buttons, keys or navigational input mechanisms. In the example embodiment illustrated, at least some of these additional input interfaces 206 are disposed for actuation at a front side 102 of the smartphone 100.

The smartphone 100 additionally includes an infrared sensor 282 which may be of the type described above with reference to FIG. 1. The infrared sensor 282 is located within the front side 102 of the smartphone 100. Accordingly, the infrared light from the infrared sensor 282 is emitted from the front side 102 of the smartphone 100. That is, an object that is located in proximity to the front side 102 of the smartphone 100 may be within the sensing area of the infrared sensor 282. For example, a head of a user conventionally operating the smartphone 100 for voice communications by placing the head in proximity to the front side 102 of the smartphone 100, may be detected by the infrared sensor 282.

Figure 4:
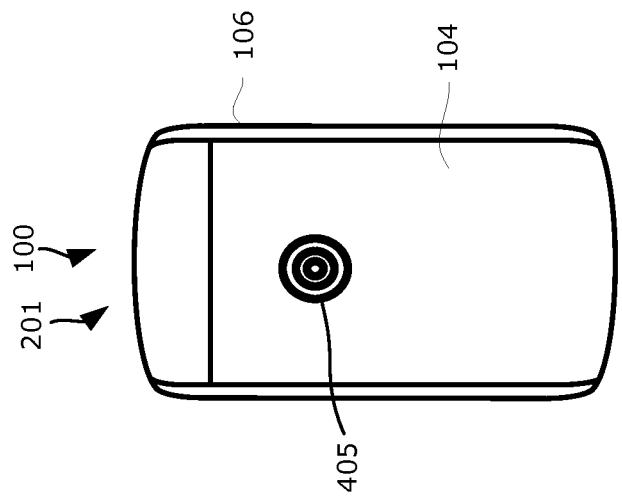
FIG. 4 is a rear view of the example smartphone of FIG. 3.

Referring now to FIG. 4, a rear view of the example smartphone 100 is illustrated. The rear side 104 of the smartphone 100 may serve as the portion a user may hold when operating the smartphone 100.

The smartphone 100 may include a NFC subsystem 270 (FIG. 1) which includes a NFC IC 272 (FIG. 1) and NFC antenna 274 (FIG. 1). The NFC antenna 274 (FIG. 1) may be located near the rear side 104 of the smartphone 100. For example, the NFC antenna 274 (FIG. 1) may be located directly underneath the housing 106 of the rear side 104 of the smartphone 100. The NFC antenna is located to emit an electro-magnetic carrier field 405 at a rear side of the electronic device 201. The NFC antenna is located such that, a user operating the smartphone 100 by placing a hand at or near the rear side 104 may change the load condition within the NFC antenna 274 (FIG. 1).

Detecting a Hand

Figure 5:
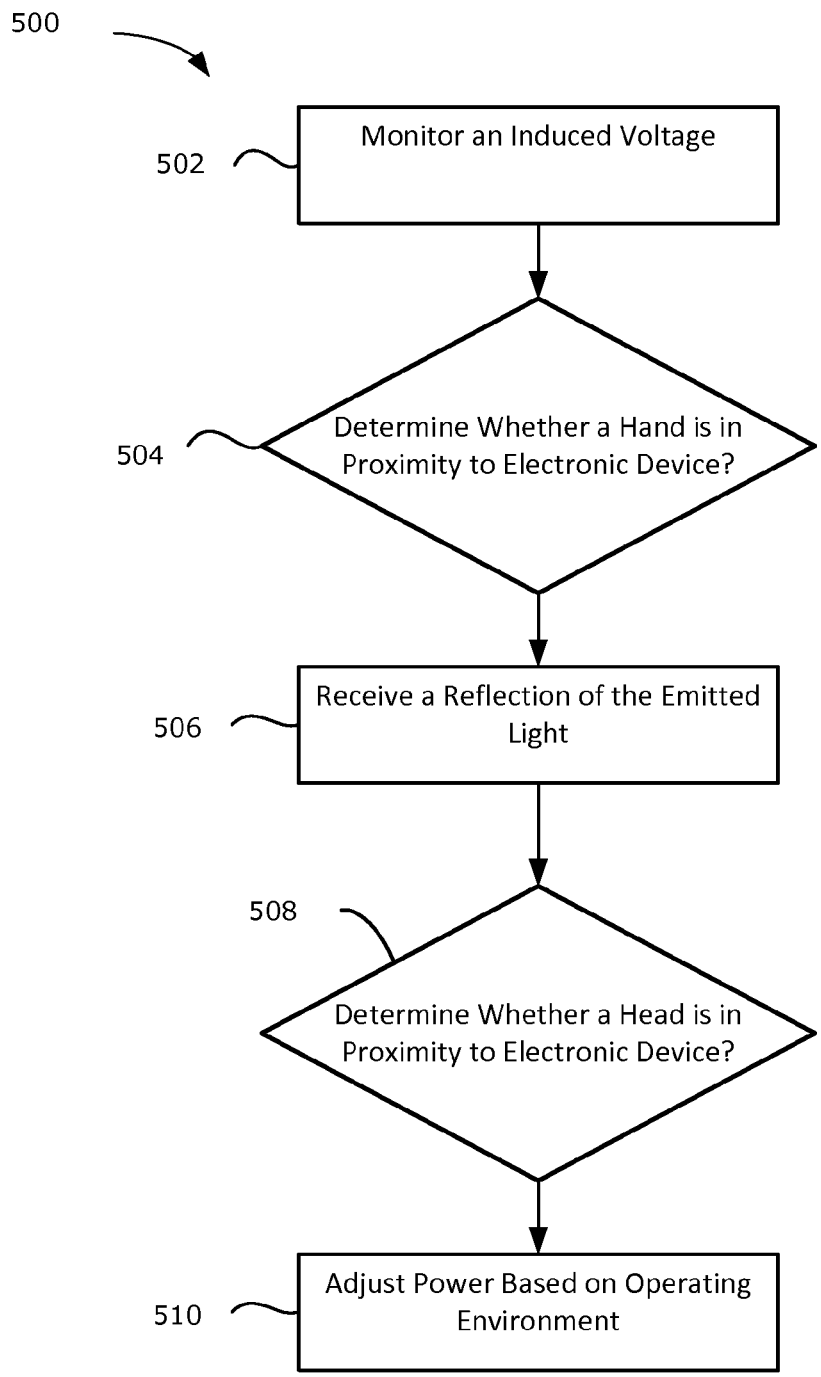
FIG. 5 is a flowchart illustrating an example method of detecting a hand in proximity to the electronic device in accordance with example embodiments of the present disclosure.

Reference will now be made to FIG. 5, in which an example method 500 of detecting a hand in proximity to an electronic device 201 is illustrated in flowchart form. The electronic device 201 may be configured to perform the method 500 of FIG. 5. In at least some example embodiments, the processor 240 of the electronic device 201 is configured to perform the method 500 of FIG. 5. One or more applications 225 or modules on the electronic device 201 may contain computer readable instructions which cause the processor 240 of the electronic device 201 to perform the method 500 of FIG. 5. In at least some example embodiments, the detection module 226 and/or the power adjuster module 228 stored in memory of the electronic device 201 are configured to perform the method 500 of FIG. 5. More particularly, the detection module 226 and/or the power adjuster module 228 may contain computer readable instructions which, when executed, cause the processor 240 to perform the method 500 of FIG. 5. In at least some example embodiments, the detection module 226 and/or the power adjuster module 228 may interface with other components, such as the NFC subsystem 270 and/or the wireless communication subsystem 211 to perform the method of 500 of FIG. 5.

It will be appreciated that the method 500 of FIG. 5 may, in at least some example embodiments, be provided by other software applications or modules apart from those specifically discussed above. Accordingly, any features which are referred to as being performed by the electronic device 201 may be performed by any one or more of the software applications or modules referred to above or other software modules. In at least some example embodiments, at least some of the method 500 of FIG. 5 may be performed by or may rely on other applications or modules.

At 502, the electronic device 201 monitors an induced voltage at the NFC antenna 274. More particularly, the electronic device 201 passes a current through the NFC antenna 274 which causes the NFC antenna to emit an electro-magnetic carrier field 405. Then, the electronic device 201 monitors an induced voltage at the NFC antenna 274.

As mentioned above, the NFC antenna 274, which may be an inductor, produces an electro-magnetic carrier field when a current passes through the NFC antenna 274. The current may be generated by the NFC IC 272 or the processor 240 of the electronic device 201, or other components. As the NFC antenna 274 has a particular load, a voltage is induced within the NFC antenna 274 when the NFC antenna 274 is operating in free space (i.e. when the NFC antenna 274 is not near any external objects). The created induced voltage within the NFC antenna 274 may be represented by the following equation which is based on the principles of Ohm's Law:

$$V = I \times Z$$

where I is the current supplied by, for example, the NFC IC 272, Z is the impedance (i.e. the complex generalization of resistance) of the NFC antenna, and V is the voltage induced within the NFC antenna 274.

The electronic device 201 monitors the induced voltage created within the NFC antenna 274. In at least some example embodiments, the electronic device 201 may interface with the NFC IC 272 to monitor the induced voltage at the NFC antenna 274. For example, the electronic device 201 may query the NFC IC 272 for the induced voltage at the NFC antenna 274, and the NFC IC 272 may report the induced voltage. In other example embodiments, the NFC IC 272 may inform the electronic device 201 of the induced voltage at the NFC antenna 274.

The electronic device 201 then, at 504, determines whether a hand is in proximity to the electronic device 201 based on the induced voltage. For example, the electronic device 201 may determine whether a change in the induced voltage at the NFC antenna 274 correlates to the load of a hand.

As the NFC antenna 274 generates an electro-magnetic carrier field, a change in the load condition within the electro-magnetic carrier field varies the induced voltage at the NFC antenna 274. Based on the equation:

$$V' = I \times Z'$$

if the current I supplied by, for example the NFC IC 272, is constant, and the impedance Z increases to Z' due to for example, an additional load, the induced voltage also increases from V to V'.

The presence of a load in proximity to the NFC antenna 274 increases the induced voltage at the NFC antenna 274. However, the induced voltage at the NFC antenna 274 may constantly fluctuate based on objects being near the electronic device 201 that may be located within the electro-magnetic carrier field and vary the induced voltage at the NFC antenna 274. Accordingly, the electronic device 201, in determining whether a hand is near the electronic device 201, may detect that a variation in the induced voltage is above a pre-determined threshold that relates to the load of a typical hand. For example, the difference between V' and V should be above a specified voltage value in order for the electronic device 201 to determine that a hand is in proximity to the electronic device 201. That is:

$$\Delta V = V' - V > V_{th}$$

where $\Delta V$ is the difference between the induced voltage when an additional load is present and the induced voltage when no additional load is present (i.e. the load of the NFC antenna 274), and $V_{th}$ is the pre-determined threshold voltage that $\Delta V$ should be greater than in order for the electronic device 201 to detect the presence of a hand. If the difference between V' and V is below the specified voltage value, the electronic device 201 may determine that a hand is not in proximity to the electronic device 201.

In at least some example embodiments, when performing the determination process, the electronic device 201 may retrieve the pre-determined threshold value from the memory 244 of the electronic device 201. The electronic device 201 may then compare the change in the induced voltage to the pre-determined threshold value in order to determine whether the change in the induced voltage is caused by the load of a hand.

In at least some example embodiments, the electronic device 201 may not analyze the variation in the induced voltage, but rather, may determine if the induced voltage at the NFC antenna 274 is above a pre-determined threshold voltage. That is, the electronic device 201 may determine the presence of a hand if the induced voltage is above a pre-determined threshold voltage. More specifically:

$$V' > V_{th}'$$

where $V_{th}'$ is another pre-determined threshold voltage that represents a voltage value that the induced voltage when an additional load is present (i.e. V') should be greater than in order for the electronic device 201 to detect the present of hand. Accordingly, the difference between the induced voltages at the NFC antenna 274 prior to and after the presence of a load may not be calculated, and the induced voltage at the NFC antenna 274 after the load is present may only be considered during the determination process.

In at least some example embodiments, the NFC antenna 274 is located near a rear side 104 of the electronic device 201. In such example embodiments, the electro-magnetic carrier field generated by the NFC antenna 274 is propagated surrounding the rear side 104 of the electronic device 201. Accordingly, a load such as a hand is within the electromagnetic-carrier field when placed at or near a rear side 104 of the electronic device 201. For example, a hand of a user holding the electronic device 201 from the rear side 104 may be detected.

In at least some embodiments, whether a hand is detected or not, at 506 the electronic device 201 may receive a reflection of infrared light emitted by an infrared sensor 282 associated with the electronic device 201. For example, an object within the path of the emitted infrared light may be reflected to a sensing area of the infrared sensor 282. The reflected infrared light is then received by the electronic device 201 from the infrared sensor 282.

The electronic device 201 may then, at 508, determine whether a head is in proximity to the electronic device 201 based on the received reflection. For example, the electronic device 201 may analyze the received reflected infrared light and the emitted infrared light to determine whether the object reflecting the infrared light is a head of a user of the electronic device 201. For example, the electronic device 201 may analyze the level and intensity of the reflected infrared light and the emitted infrared light when performing the determination process. Based on the analysis, the electronic device 201 may determine whether the electronic device 201 is likely in proximity to a head.

In at least some example embodiments, the infrared sensor 282 is located at or near a front side 102 of the electronic device 201. Accordingly, the infrared light is emitted around the front side 102 of the electronic device 201, and infrared light is reflected from objects within the vicinity of the front side 102 of the electronic device 201. For example, a head of a user operating the electronic device 201 by placing the head near the front side 102 of the electronic device 201 may reflect the emitted infrared light to the electronic device 201 via the infrared sensor 282.

After the determination processes of 504 and 508, the electronic device 201 may adjust the power output (and/or the total isotropic sensitivity) of the mobile antenna 220 associated with the electronic device 201 based on the determination results of 504 and 508. More particularly, the power or sensitivity may be adjusted at 510 based on the operating environment of the electronic device 201. That is, the power of the RF signals transmitted by the mobile antenna 220 is accordingly adjusted.

For example, in at least some example embodiments, if it is determined that a hand and a head are in proximity to the electronic device 201, the electronic device 201 may adjust the power output of the mobile antenna 220 to a first power output state (and the sensitivity of the mobile antenna 220 may be adjusted to a first sensitivity state). In some example embodiments, if it is determined that only the head and not the hand is in proximity to the electronic device 201, the electronic device 201 may adjust the power output of the mobile antenna 220 to a second power output state (and the sensitivity of the mobile antenna 220 may be adjusted to a second sensitivity state). In some example embodiments, if it is determined that the head and the hand are not in proximity to the electronic device 201, the electronic device 201 may adjust the power output of the mobile antenna 220 to a third power output state (and the sensitivity of the mobile antenna 220 may be adjusted to a third sensitivity state). In some example embodiments, if it is determined that only the hand and not the head is in proximity to the electronic device 201, the electronic device 201 may adjust the power output of the mobile antenna to a fourth power output state (and the sensitivity of the mobile antenna 220 may be adjusted to a fourth sensitivity state). Accordingly, in some example embodiments, the power output of the mobile antenna 220 may be adjusted to one of four power output states and the sensitivity may be adjusted to one of four sensitivity output states. In at least some example embodiments, the level of power of the different output states and the sensitivity may depend upon specifications provided by one or more wireless network carriers operating the wireless network 101 in which the RF signals are transmitted.

The electronic device 201 may adjust the power output and/or the sensitivity by tuning one or more tunable capacitors. That is, the one or more tunable capacitors may vary the capacitance to accordingly adjust the power output, for example, to the first power output state, to the second power output state, to the third power state or to the fourth power output state. In at least some example embodiments, the one or more tunable capacitors may be tuned to impedance match the power amplifier 214 (or the transmitter 213) to the mobile antenna 220 to maximize the power output. For example, the impedance of the power amplifier 214 (or the transmitter 213) may be adjusted by supplying the appropriate reactance to match the complex conjugate impedance of the mobile antenna 220 which accordingly maximizes the power output of the mobile antenna 220. In such example embodiments, the first power output state may require a maximum power output.

It will be appreciated that the implementation of tunable capacitors is one of a number of example embodiments to adjust the power output and/or match the impedance. For example, in at least some example embodiments, an impedance bridge may instead be implemented.

In at least some embodiments, the memory of the electronic device may include tuning information for each of the different power output states. The tuning information may specify how the tuning capacitors are to be adjusted for the conditions described above (e.g. head and hand, head only, hand only, free space).

As noted above, the electronic device 201 may detect the presence of a hand in other methods in other embodiments. For example, the electronic device 201 may additionally use orientation information of the electronic device 201 to determine whether a hand is in proximity to the electronic device 201. One such example embodiment will now be illustrated.

Figure 6:
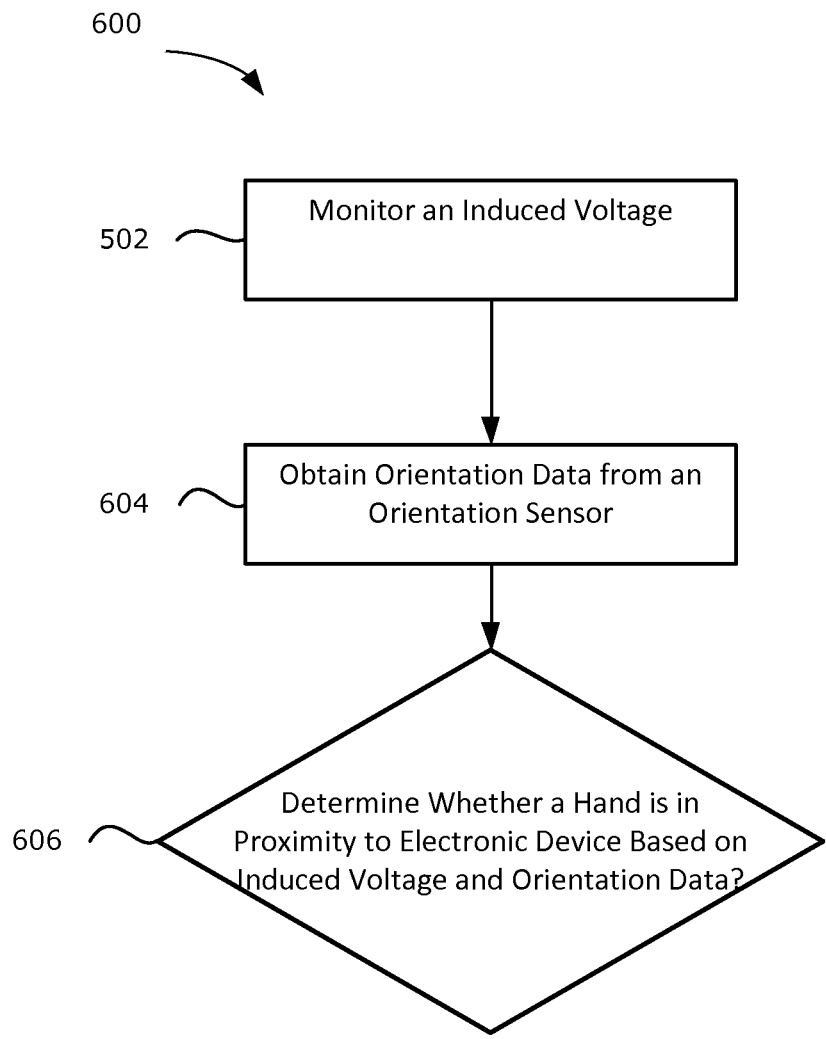
FIG. 6 is a flowchart illustrating another example method of detecting a hand in proximity to the electronic device in accordance with example embodiments of the present disclosure.

Referring now to FIG. 6, a flowchart of another example method of detecting a hand in proximity to the electronic device 201 is illustrated. The electronic device 201 may be configured to perform the method 600 of FIG. 6. In at least some example embodiments, the processor 240 of the electronic device 201 is configured to perform the method 600 of FIG. 6. One or more applications 225 or modules on the electronic device 201 may contain computer readable instructions which cause the processor 240 of the electronic device 201 to perform the method 600 of FIG. 6. In at least some example embodiments, the detection module 226 and/or the power adjuster module 228 stored in memory of the electronic device 201 are configured to perform the method 600 of FIG. 6. More particularly, the detection module 226 and/or the power adjuster module 228 may contain computer readable instructions which, when executed, cause the processor 240 to perform the method 600 of FIG. 6. In at least some example embodiments, the detection module 226 and/or the power adjuster module 228 may interface with other components, such as the NFC subsystem 270 and/or the wireless communication subsystem 211 to perform the method of 600 of FIG. 6.

It will be appreciated that the method 600 of FIG. 6 may, in at least some example embodiments, be provided by other software applications or modules apart from those specifically discussed above. Accordingly, any features which are referred to as being performed by the electronic device 201 may be performed by any one or more of the software applications or modules referred to above or other software modules. In at least some example embodiments, at least some of the method 600 of FIG. 6 may be performed by or may rely on other applications or modules.

The method 600 includes, at 502, monitoring an induced voltage at an NFC antenna 274. 502 is discussed in greater detail above with reference to FIG. 5. More particularly, the electronic device 201 passes a current through the NFC antenna 274 which causes the NFC antenna to emit an electromagnetic carrier field 405. Then, the electronic device 201 monitors an induced voltage at the NFC antenna 274.

At 604, the electronic device 201 may obtain orientation data from the orientation sensor 280. The orientation data may indicate the orientation of the electronic device 201 relative to the gravitational field of the earth at the particular point in time. That is, the orientation data may indicate the relative position of the electronic device 201 which may define any position in space. For example, the electronic device 201 may have a tilted orientation, flipped orientation, table-top orientation, etc.

Next at 606, the electronic device 201 may determine whether a hand is in proximity to the electronic device 201 based on the induced voltage and the orientation data. That is, the electronic device 201 may determine the presence of a hand depending on the induced voltage and the orientation data. The determination based on the induced voltage may be carried out in the same manner as described above with reference to 504 of FIG. 5. Additionally, the electronic device 201 may analyze the orientation data in determining whether a hand is near the electronic device 201.

For example, in at least some example embodiments, the electronic device 201 may determine whether the electronic device 201 is in a table-top orientation and, if so, may determine that a hand is not near the electronic device 201. For example, an electronic device 201 having a table-top orientation may be lying flat on a surface that acts as a load, and accordingly induces a voltage within the NFC antenna 274 that is near the rear side 104 of the electronic device 201. In such example embodiments, even though a change in the induced voltage is detected which may be above a pre-determined threshold correlating to a hand (which is actually attributed to the surface), the electronic device 201 may determine that a hand is not near the electronic device 201 as the electronic device 201 has a table-top orientation.

While the present application is primarily described in terms of methods, a person of ordinary skill in the art will understand that the present application is also directed to various apparatus such as an electronic device 201 including a mobile communications device. The electronic device 201 includes components for performing at least some of the aspects and features of the described methods, which may be by way of hardware components (such as the memory 244 and/or the processor 240), software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present application.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

Example embodiments of the present application are not limited to any particular operating system, system architecture, mobile device architecture, server architecture, or computer programming language.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A method for detecting a hand in proximity to an electronic device, the electronic device including a near field communications (NFC) antenna and an infrared sensor that emits infrared light, the method comprising:
   monitoring an induced voltage at the NFC antenna, the NFC antenna provided in an NFC subsystem configured to communicate wirelessly according to an NFC protocol, the NFC protocol operating with a working distance of 4 cm or less;
   determining whether the hand is in proximity to the electronic device based on the induced voltage;
   receiving a reflection of the emitted infrared light;
   determining whether a head is in proximity to the electronic device based on the reflection; and
   selecting a power output state from a plurality of possible power output states provided by the electronic device, the selection based on both the determination of whether the head is in proximity to the electronic device and the determination of whether the hand is in proximity to the electronic device.

2. The method claim 1, wherein the NFC antenna generates an electro-magnetic carrier field, and wherein determining comprises: detecting that a variation in the induced voltage is above a pre-determined threshold, wherein said variation is based on a change in load condition within the electro-magnetic carrier field due to the hand in proximity to the electronic device.

3. The method of claim 1, wherein the NFC antenna is located near a rear side of the electronic device.

4. The method of claim 1, wherein the electronic device includes an orientation sensor, and wherein the method further comprises: prior to determining that the hand is in proximity to the electronic device, obtaining orientation data from the orientation sensor, and wherein the determination of whether the hand is in proximity to the electronic device is made based on the induced voltage and the orientation data.

5. The method of claim 1, wherein the electronic device includes a mobile antenna, and wherein the method further comprises: adjusting a power output of the mobile antenna to a first power output state if it is determined that the hand and the head are in proximity to the electronic device.

6. The method of claim 5, wherein said adjusting is performed by one or more tunable capacitors for impedance matching of the mobile antenna to maximize the power output.

7. The method of claim 5, further comprising: adjusting the power output of the mobile antenna to a second power output state if it is determined that the head is in proximity to the electronic device and the hand is not in proximity to the electronic device.

8. The method of claim 7, further comprising: adjusting the power output of the mobile antenna to a third power output state if it determined that the hand and the head are not in proximity to the electronic device.

9. The method of claim 8, further comprising: adjusting the power output of the mobile antenna to a fourth power output state if it is determined the hand is in proximity to the electronic device and the head is not in proximity to the electronic device.

10. The method of claim 1, wherein the infrared sensor is positioned on the electronic device to emit infrared light from a front side of the electronic device.

11. The method of claim 1, wherein the plurality of possible power output states provided by the electronic device include a power output state to be used when both a head and a hand are detected and a different power output state to be used when a hand is detected but a head is not detected.

12. An electronic device comprising:
a memory;
a near field communications (NFC) subsystem including an NFC antenna, the NFC subsystem configured for communicating wirelessly according to an NFC protocol, the NFC protocol operating with a working distance of 4 cm or less;
an infrared sensor that emits infrared light;
a processor coupled with the memory and the NFC antenna, the processor being configured to detect a hand in proximity to the electronic device by:
monitoring an induced voltage at the NFC antenna; and
determining that the hand is in proximity to the electronic device based on the induced voltage,
the processor further configured to:
receive a signal indicating a reflection of the emitted infrared light;
determine whether a head is in proximity to the electronic device based on the reflection; and
select a power output state from a plurality of possible power output states provided by the electronic device, the selection based on both the determination of whether the head is in proximity to the electronic device and the determination of whether the hand is in proximity to the electronic device.

13. The electronic device of claim 12, wherein the processor is further configured to generate an electro-magnetic carrier field using the NFC antenna, and determining that a hand is in proximity to the electronic device comprises: detecting that a variation in the induced voltage is above a pre-determined threshold, wherein said variation is based on a change in load condition within the electro-magnetic carrier field due to the hand in proximity to the electronic device.

14. The electronic device of claim 12, wherein the NFC antenna is located near a rear side of the electronic device.

15. The electronic device of claim 12, further comprising an orientation sensor coupled to the processor, the processor being further configured to: prior to determining that the hand is in proximity to the electronic device, obtain orientation data from the orientation sensor, and wherein the determination of whether the hand is in proximity to the electronic device is made based on the induced voltage and the orientation data.

16. The electronic device of claim 12, further comprising a mobile antenna, the processor being further configured to: adjust the power output of the mobile antenna to a first power output state if it determined that the hand and the head are in proximity to the electronic device.

17. The electronic device of claim 16, further comprising, one or more tunable capacitors coupled to the mobile antenna and to other components of a communication subsystem, and wherein adjusting the power output comprises adjusting the tunable capacitors.

18. The electronic device of claim 16, the processor being further configured to: adjust the power output of the mobile antenna to a second power output state if it is determined that the head is in proximity to the electronic device and the hand is not in proximity to the electronic device.

19. A non-transitory computer-readable storage medium having stored thereon computer executable instructions for detecting a hand in proximity to an electronic device, the computer executable instructions including instructions for:
monitoring an induced voltage at a near field communications (NFC) antenna, the NFC antenna provided in an NFC subsystem configured to communicate wirelessly according to an NFC protocol, the NFC protocol operating with a working distance of 4 cm or less; and
determining that the hand is in proximity to the electronic device based on the induced voltage,
receiving a signal indicating a reflection of the emitted infrared light emitted by an infrared sensor;
determining whether a head is in proximity to the electronic device based on the reflection;
selecting a power output state from a plurality of possible power output states provided by the electronic device, the selection based on both the determination of whether the head is in proximity to the electronic device and the determination of whether the hand is in proximity to the electronic device.

* * * * *